United States Patent
Berghof et al.

(10) Patent No.: US 11,083,322 B2
(45) Date of Patent: Aug. 10, 2021

(54) METHOD AND DEVICE FOR DETERMINING THE COOKED STATE DURING THE COOKING OF EGGS

(71) Applicants: Evonta-Technology GmbH, Dresden (DE); Reinhold Berghof, Dennheritz (DE)

(72) Inventors: Reinhold Berghof, Dennheritz (DE); Björn Fischer, Limbach-Oberfrohna (DE); Sven Meissner, Brand-Erbisdorf (DE)

(73) Assignees: Evonta-Technology GmbH, Dresden (DE); Reinhold Berghof, Dennheritz (DE)

( * ) Notice: Subject to any disclaimer, the term of this patent is extended or adjusted under 35 U.S.C. 154(b) by 25 days.

(21) Appl. No.: 16/497,823

(22) PCT Filed: Mar. 26, 2018

(86) PCT No.: PCT/DE2018/000077
§ 371 (c)(1),
(2) Date: Sep. 26, 2019

(87) PCT Pub. No.: WO2018/177451
PCT Pub. Date: Oct. 4, 2018

(65) Prior Publication Data
US 2020/0046158 A1  Feb. 13, 2020

(30) Foreign Application Priority Data
Mar. 27, 2017 (DE) .................. 102017106512.1

(51) Int. Cl.
*A47J 29/02* (2006.01)
*A23L 15/00* (2016.01)
*A23L 5/10* (2016.01)

(52) U.S. Cl.
CPC .............. *A47J 29/02* (2013.01); *A23L 5/15* (2016.08); *A23L 15/00* (2016.08); *A23V 2002/00* (2013.01)

(58) Field of Classification Search
CPC .. A47J 29/02; A23L 15/00; A23L 5/15; A23V 2002/00
See application file for complete search history.

(56) References Cited

U.S. PATENT DOCUMENTS

| | | | |
|---|---|---|---|
| 3,227,065 A | | 1/1966 | Litman |
| 4,955,728 A | * | 9/1990 | Hebrank ............... A01K 43/00 209/510 |
| 5,745,228 A | * | 4/1998 | Hebrank ............. G01N 33/085 356/53 |
| 6,535,277 B2 | * | 3/2003 | Chalker, II ............ A01K 43/00 356/53 |

FOREIGN PATENT DOCUMENTS

| | | |
|---|---|---|
| DE | 1679045 B | 1/1972 |
| DE | 2354687 A1 | 5/1975 |
| DE | 3508679 A1 | 9/1986 |
| DE | 3904675 A1 | 8/1990 |
| WO | 2006087537 A1 | 8/2006 |
| WO | 2008007041 | 1/2008 |
| WO | WO-2008007041 A1 * 1/2008 .............. A47J 29/02 |
| WO | WO-2015162033 A1 * 10/2015 ........... A23B 5/0052 |

OTHER PUBLICATIONS

Google patents English translation DE3508679; 'Device forboiling eggs'; pp. 1-7; Kleinwaechteretal.; publication date Aug. 20, 1987. (Year: 1987).*

* cited by examiner

*Primary Examiner* — Steven N Leff
(74) *Attorney, Agent, or Firm* — Michael Soderman

(57) ABSTRACT

Methods and devices for determining the cooked state of eggs. These are characterised in particular in that the cooked state of the egg can be monitored and/or the cooking process can be ended when a desired cooked state has been reached. To this end, an egg is positioned in a vessel, the temperature is increased, and at least one light source is positioned on or in the direct vicinity of the egg. The transmission of light through the egg is determined and a transmission of at least 96% of the maximum transmission degree of a raw egg is achieved for a runny yolk, of at least 94% is achieved for a soft yolk, of at least 90% is achieved for a medium soft yolk, and at least 85% is achieved for a hard yolk.

6 Claims, No Drawings

METHOD AND DEVICE FOR DETERMINING THE COOKED STATE DURING THE COOKING OF EGGS

CROSS REFERENCE TO RELATED APPLICATIONS

This application is the U.S. national stage of International Application No. PCT/DE2018/000077, filed on 2018 Mar. 26. The international application claims the priority of DE 102017106512.1 filed on 2017 Mar. 27; all applications are incorporated by reference herein in their entirety.

BACKGROUND

The present invention concerns the field of process engineering and relates to a method and to a device for determining the cooked state of eggs which can be used for example as an egg cooker, in particular for cooking bird eggs, such as chicken eggs.

Boiling eggs is a commonplace process that does not seem to be too complicated but is known to produce non-uniform results again and again. Depending on, for example, the size and starting temperature of the eggs, different final results for the cooked state of the eggs may be achieved under the same conditions. As is known, however, these are only two of the parameters that can influence the cooking of eggs and thus the desired degree of cooking.

Usually before cooking the eggs, eggs are pierced on the lower, broad side, the rounded pole of an egg, which usually has an air chamber, and then the eggs are placed in a pot filled with water so that the water covers the eggs. The cooking time starts when the water is boiling. The eggs are usually left in the boiling water for between 3 to 10 minutes and are then held under cold water to stop the cooking process. Typically for medium-sized eggs, a cooking time of 4 to 5 minutes is suggested if the yolk is to be runny, of 5 to 6 minutes for a soft egg, of 6 to 8 minutes for a medium soft egg, and of 8 to 10 minutes for a hard-boiled egg. However, these desired cooking results are not achieved, for example, if the eggs are taken directly from the refrigerator.

The optimum cooking temperature of the yolk is around 65° C. to 70° C. The creamy consistency is maintained at these temperatures. However, if the egg is cooked for longer or at overly high temperatures, a floury consistency sets in.

Egg cookers are also known that are electrically operated as kitchen appliances. An electric egg cooker usually consists of a heater in which water is heated, an attachment for the eggs and a lid having an opening on the top from which water vapour can escape. The cooking time can generally be set by a rotary switch or be determined by the amount of water added. The desired results are not achieved here either if, for example, differently sized eggs or eggs from the refrigerator are used.

Egg cookers are also known which are provided for use in the microwave, wherein the egg is positioned in a vessel and the cooked state is to be regulated by the addition of a certain amount of water similarly to the known electric egg cookers and then cooked in the microwave for a predetermined time.

According to DE 23 54 687 A1, an egg cooker having a waterless, electric mode of operation is known in which heating wires are arranged in a tunnel or in a housing having at least one tunnel for egg-cooking purposes, wherein the eggs are pushed into the tunnel on a slide and are automatically removed from the tunnel at the end of the cooking time, which is selected on the timer, with a bell sounding to indicate that the egg is ready.

A device for the semi-automatic and waterless cooking of eggs having a heat source for infrared heat radiation is disclosed in U.S. Pat. No. 3,227,065 A.

An egg-cooking apparatus is disclosed in WO 2006/087 537 A1 and consists of two half-shells made of silicone adapted to the shape of an egg and which is heated by means of heating wires introduced in a crimped manner. The device has temperature-monitoring sensors which monitor the cooking time.

WO 2008/007 041 A1 discloses a two-part cooking apparatus, wherein the device for cooking consists of a vessel which contains a plurality of heating elements in the form of halogen lamps, these halogen lamps being arranged along the circumference of the vessel and the food to be cooked being placed inside the halogen lamps, and further a device part is provided that supports the food to be cooked and cooking takes place without liquids. In this device, the cooking time can be set individually, but the cooked state is not monitored during the cooking process One disadvantage of the known solutions is that the cooking time of eggs is regulated only in terms of time and/or the amount of water. Other characteristics of eggs that result from the starting temperature, size and/or the elapsed storage period of eggs and that affect the cooking process and the desired cooking result are not taken into account in the conventional cooking methods. Another disadvantage is that the cooking of eggs with water or steam also always depends on the air pressure and that, in addition, water or steam can cause dirt and residual water to remain in the egg cookers, which can lead to unhygienic conditions in the egg cookers.

DE 35 08 679 A1 discloses a device for cooking eggs, wherein light is shone through an egg to be cooked during the cooking process and the cooking process is stopped after a predetermined intensity decrease in the transmission radiation of a light source corresponding to a desired cooked state has been achieved. A standard curve of the transmission of the light emitted by the light source through the egg to be cooked is used depending on the cooking time. A desired cooked state depending on the properties of the actual egg to be cooked cannot be achieved.

DE 39 04 675 A1 discloses the use of an optoelectronic arrangement for detecting the state of eggs. The egg to be examined is in this case arranged between a transmitting element and a receiving element.

An electric egg cooker is disclosed in DE 1 679 045. Said cooker has a lower part, a lid attached thereto by means of a hinge, and a bimetal switch which shuts off the heating circuit when a certain temperature is reached. In this case, the lid opens automatically by spring action. A cooking process according to the cooked state of the egg is not provided.

DE 23 54 687 A1 relates to an egg cooker having waterless, electric operation which consists of a housing and at least one tunnel with heating wires designed to accommodate the eggs, a heat regulator, notches and a timer. A cooking process according to the cooked state of the egg is not possible.

SUMMARY

The invention relates to methods and devices for determining the cooked state of eggs.

These are characterised in particular in that the cooked state of the egg can be monitored and/or the cooking process can be ended when a desired cooked state has been reached.

To this end, an egg is positioned in a vessel, the temperature is increased, and at least one light source is positioned on or in the direct vicinity of the egg. The transmission of light through the egg is determined and a transmission of at least 96% of the maximum transmission degree of a raw egg is achieved for a runny yolk, of at least 94% is achieved for a soft yolk, of at least 90% is achieved for a medium soft yolk, and at least 85% is achieved for a hard yolk.

DETAILED DESCRIPTION

The object of the invention is to provide a method and a device for determining the cooked state when eggs are cooked so that, in particular, the cooked state of the egg can be monitored during cooking and/or the cooking process can be ended when the egg has reached a desired cooked state.

This object is achieved with the features listed in the claims.

Advantageous embodiments are the subject matter of the subclaims, wherein the invention also includes combinations of the individual dependent claims in the sense of an AND operation as long as they are not mutually exclusive.

The methods and devices for determining the cooked state when cooking eggs are characterised in particular by the fact that the cooked state of the egg can be monitored during cooking and/or that the cooking process can be ended when a desired cooked state of the egg has been reached.

The object is achieved by a method for determining the cooked state when cooking eggs, during which at least one egg is positioned in a vessel, wherein a plurality of identical or different eggs may be arranged in or outside of the vessel, side by side, above or below each other, the vessel is then closed and the temperature is increased and maintained at least inside the vessel until the desired cooked state of the egg or eggs is achieved, and the egg is then cooled, wherein to determine the cooked state of the egg or eggs in the vessel at least one light source having a wavelength between 400 nm to 1000 nm is positioned on or in the direct vicinity of the egg or eggs, said light source transmitting light through at least one cross section of the egg to a light meter, and the transmission of the light through the egg being determined at least during the cooking process and, to achieve a cooked state for a runny yolk, a transmission of at least 96% of the maximum transmission degree of a raw egg and, to achieve a cooked state for a soft yolk, a transmission of at least 94% and, to achieve a cooked state for a medium soft yolk a transmission of at least 90% and, to achieve a cooked state for a hard yolk, a transmission of at least 85% is realised.

Advantageously, the cooking may be carried out without water.

It is also advantageous to use as a vessel a transparent vessel or a vessel that is impermeable to waves in the wavelength range of the light source.

It is also advantageous to use a light source having a wavelength between 500 nm and 1000 nm, preferably between 500 nm and 650 nm.

It is advantageous in addition to position an egg in the vessel in a device for cooking a plurality of eggs so that all the eggs in the device may be cooked in accordance with the cooked state of the egg in the vessel.

Advantageously, the cooling rate of the egg may range from 100 K/s to 10 K/s.

The temperature may advantageously be increased until a transmission from 96% to 95% for the cooked state for a runny yolk of a chicken egg, from 94% to 92% for the cooked state for a soft yolk of a chicken egg, from 91% to 90% for the cooked state for a medium soft yolk of a chicken egg, or from 89% to 87% for the cooked state for a hard yolk of a chicken egg has been achieved.

A device for determining the cooked state when cooking eggs comprises at least one vessel, a positioning means for at least one egg in the vessel, and at least one energy source for increasing the temperature. Furthermore, at least one light source having a wavelength between 400 nm and 1000 nm is positioned on or in the direct vicinity of the egg. In addition, at least one light-measuring device is arranged on the opposite side of the light source for determining the transmission of the light through the egg, wherein the egg is positioned with at least one cross section between the light source and the light-measuring device. The light-measuring device is connected to at least one signalling device and/or display device so that a cooked state for a runny yolk having a transmission of at least 96% of the maximum transmission degree of a raw egg, a cooked state for a soft yolk having a transmission of at least 94%, a cooked state for a medium soft yolk having a transmission of at least 90%, and/or a cooked state for a hard yolk having a transmission of at least 85% is signalled and/or displayed.

Advantageously, the light source may have a wavelength between 500 nm and 1000 nm, preferably between 500 nm and 650 nm.

Likewise advantageously, a photodiode, a photocell, a photodetector, a phototransistor, a CMOS device or a CCD sensor may be used as the light-measuring device.

The energy source may advantageously be at least one electric heating wire, an inductive heating device, an electromagnetic wave source and/or an assembly for heating water.

The vessel may in particular be a transparent vessel or a vessel impermeable to electromagnetic waves in the wavelength range from 400 nm to 1000 nm, preferably from 500 nm to 1000 nm, the vessel and/or the positioning device being made of stainless steel, silicone, plastics material and/or glass.

Furthermore advantageously, the positioning means may have an annular shape for receiving an egg, wherein the diameter of the annular positioning means is smaller than the largest diameter of the egg, or the positioning means is formed with three or more support points with the distance between the support points to each other being smaller than the largest diameter of the egg.

The solution according to the invention specifies a method and a device for determining the cooked state when cooking eggs wherein, in particular, the cooked state of the egg is monitored during cooking and the cooking process can be ended at a desired cooked state of the egg.

This is achieved with a method and a device for cooking eggs, advantageously chicken eggs, in which at least one egg is positioned in a vessel where the transmission of electromagnetic waves of a light source, which is also arranged in the vessel, through the egg is measured.

The vessel should preferably be substantially impermeable. In the context of the present invention, "impermeable" is to be understood as meaning that substantially at least no electromagnetic waves penetrate the vessel in the wavelength range of the electromagnetic waves emitted by the light source in the vessel. However, the vessel may also be made of a transparent material such as preferably glass and/or plastics material or may also consist of a light-impermeable material, such as metal, stainless steel and/or plastics material.

It is also possible according to the invention that a plurality of identical or different eggs may be arranged in or outside the vessel, side by side, above or below each other and then the cooked state of each egg or eggs in the vessel or vessels is determined with the light sources. If eggs of a particular batch, i.e. eggs of the same type, age, origin, size and/or temperature, are in a cooking device, the determination of the cooked state of one egg is sufficient for all the other eggs. If the eggs are different in size and age, the cooked state may differ and may not be determined only by identifying the cooked state of one egg.

After closing the vessel, the temperature in the vessel is increased. This may be achieved by one or a plurality of energy sources in or outside the vessel. Such an energy source may be one or a plurality of heating wires, inductive heating, an assembly for generating electromagnetic waves and/or an assembly for heating water. The temperature is increased until a desired maximum temperature is reached and subsequently the temperature may be maintained at this or another temperature. The temperature progression is determined according to the respectively achieved cooked state of the egg. The egg is then cooled.

The egg in the vessel may be positioned on a positioning means, advantageously an annular receiving means for the egg, wherein the diameter of the annular positioning means should be smaller than the largest diameter of the egg so that the egg is firmly positioned.

Advantageously, the egg may be positioned in direct contact with a light source. The light source emits electromagnetic waves in the wavelength range between 400 nm and 1000 nm, and the electromagnetic waves are guided through the egg and then hit a light-measuring device which measures the transmission of the electromagnetic waves. The cooked state of the egg is determined in accordance with the transmission of the electromagnetic waves.

Advantageously, the light source may be a light-emitting diode (LED).

Advantageously, the transmission of the waves through the largest cross section of the egg can be measured. Other cross sections of the egg may be used for the measurement as well, but then the calibration of the transmission values for the cooked state of the egg must be adjusted. The light source as excitation is thus advantageously arranged at the pointed or rounded pole of the egg, and the light measurement as detection is advantageously arranged on the opposite, i.e. the rounded or pointed, pole of the egg. Advantageously, the transmission through the egg should always be realised so that the waves transmit at least through the yolk.

A calibration of transmission values in eggs of different sizes and ages has shown that, during the transmission of the waves, a transmission of at least 96% of the maximum transmission degree of a raw egg must be achieved to obtain a cooked state for a runny yolk, of at least 94% to obtain a cooked state for a soft yolk, of at least 90% to obtain a cooked state for a medium soft yolk, and of at least 85% to obtain a cooked state for a hard yolk.

Advantageously, the measurement of the transmission may be performed during the entire time of cooking until the desired cooked state is reached. The cooked state of the egg can basically be monitored online. However, it is also possible to measure the transmission at specific points in time, said transmission being interrupted in a staggered manner across the heating time for different lengths of time. Thus, for example, it is possible not to perform a measurement at the beginning of the heating process and to only begin the measurements when, based on experience, the egg is starting to reach a cooked state.

The present invention therefore makes it possible to adjust the desired cooked state of an egg and thus to obtain an egg with a runny, soft, medium soft or hard yolk.

For this purpose, the light-measuring device is connected to at least one signalling device and/or display device so that a cooked state for a runny yolk with a transmission of at least 96% of the maximum transmission degree of a raw egg, a cooked state for soft yolk with a transmission of at least 94%, a cooked state for a medium soft yolk with a transmission of at least 90%, and/or a cooked state for a hard yolk with a transmission of at least 85% is signalled and/or displayed. Such devices are known. This can be achieved by means of a control device in which transmission values and the determined transmission values are stored. The comparison with the currently determined transmission values and an activation of the signalling device and/or display device may also be effected by means of this control device, which may therefore be a data processing system, for example.

Advantageously, the cooking process does not require water, which advantageously renders the change in the cooking time independent from the prevailing ambient pressure.

The cooking process is carried out depending on the initial state of the individual egg. The initial state of an egg depends on the starting temperature, size and/or the elapsed storage period of the egg. The storage period of eggs is of importance for the cooking process since the egg white contains, in addition to water, a plurality of proteins that denature at temperatures between 62° C. and 83° C. However, the mean denaturation temperature decreases during the storage period because the pH of the eggs increases due to the escape of naturally stored carbon dioxide. At identical conditions in a conventional egg cooker, the cooking of an egg stored for a longer period thus inevitably leads to a different result than with a fresh or only briefly stored egg. This is particularly important in the event that eggs of different ages are to be cooked together. Then the desired cooked state of each egg may differ with the same cooking process. The inside of eggs stored for longer has a lower pH than the inside of briefly stored eggs so that, due to the lower pH, the transmission of the desired degree of cooking is reached faster and thus the overall cooking time is correspondingly shorter.

This is also true if eggs of significantly different sizes are to be cooked at the same time. Again, the desired cooked state of each egg may differ with the same cooking process. To avoid these different cooked states in a plurality of eggs, it is advantageous that each egg to be cooked is cooked in a device according to the invention and that its cooked state is monitored.

A light source and a light-measuring device for the cooking process may be arranged on each egg. If, however, all the eggs are from the same batch and therefore match in type, age, origin, size and/or temperature, a "reference egg" may be used to determine the degree of cooking for all the eggs. In this case, it is sufficient if a light source and a light-measuring device are arranged on one egg and a plurality of eggs are cooked at the same time in a device according to the invention.

DETAILED DESCRIPTION OF THE PREFERRED EMBODIMENTS

The invention will be explained in more detail below with reference to several embodiments.

EXAMPLE 1 (Waterless Cooking of an Egg with Electric Energy Source)

The objective is to cook a medium soft egg.

For this purpose, a chicken egg is positioned in a vessel which is substantially impermeable to waves of the wavelength range of visible light and the vessel is closed. A 600 nm light source is positioned at the rounded pole of the egg, and a photodiode which measures the light that passes through the egg is positioned at the pointed pole of the same egg. Now, with the vessel closed, the transmission of light, which corresponds to 100%, is measured on the raw egg. Subsequently, the temperature within the vessel is increased by means of a heater in the vessel to at least 100° C. and maintained until a transmission of 94% is reached. This process monitors the cooked state of the egg while it is being cooked. Then the temperature in the vessel is lowered and the egg is removed from the vessel and cooled in a water bath so that the cooking process is stopped. The egg now has a medium soft consistency.

EXAMPLE 2 (Waterless Cooking of Four Eggs with Monitoring of One Egg by an Electric Energy Source)

The objective is to cook four eggs with a runny yolk.

For this purpose, the four eggs of equal size and of the same age are positioned on an annular positioning means having four annular recesses in a vessel which is substantially impermeable to waves of the wavelength range of visible light, and the vessel is closed. A light source having a wavelength of 800 nm is positioned at the pointed pole of one egg, and a photodiode which measures the light passing through the egg is positioned at the rounded pole of the same egg. Now, with the vessel closed, the transmission of the light is measured and corresponds to 100%. Subsequently, the temperature within the vessel is increased by means of a heater in the vessel to at least 100° C. and maintained until a transmission of 96% is reached. This process monitors the cooked state of the egg while it is being cooked. Then the temperature in the vessel is lowered and the eggs are removed from the vessel and cooled in a water bath so that the cooking process is stopped. The four eggs now have a runny yolk.

EXAMPLE 3 (Cooking an Egg with Water)

The objective is to cook three eggs with a hard yolk.

For this purpose, three eggs of equal size and of the same age are positioned on an annular positioning means having three annular recesses in a vessel which is substantially impermeable to waves of the wavelength range of visible light, and the vessel is closed. A 500 nm light source is positioned at the rounded pole of one egg, and a photodiode which measures the light passing through the egg is positioned at the pointed pole of the same egg. Now, with the vessel closed, the transmission of the light is measured and corresponds to 100%. Subsequently, the temperature within the vessel is increased by means of a heater and water in the vessel to at least 100° C. and is maintained until a transmission of 85% is reached. This process monitors the cooked state of the egg while it is being cooked. Then the temperature in the vessel is lowered at 100 K/m in so that the cooking process is stopped, and the eggs are removed from the vessel. The three eggs now have a hard yolk.

EXAMPLE 4 (Cooking an Egg with Electromagnetic Waves)

The objective is to cook a medium soft egg.

For this purpose, a chicken egg is positioned in a vessel transparent to light having a wavelength of 900 nm on a positioning means having three support points and the vessel is closed. A 900 nm light source is positioned at the rounded pole, and a photodiode that measures the light passing through the egg is positioned at the pointed pole. Now, with the vessel closed, the transmission of the light is measured and corresponds to 100%. Subsequently, the temperature within the vessel is increased by means of electromagnetic waves in the vessel to 100° C. and the heated air is substantially evenly distributed in the vessel by means of a fan and maintained until a transmission of 94% is reached. This process monitors the cooked state of the egg while it is being cooked. Then, the temperature in the vessel is lowered to 150 K/s so that the cooking process is stopped, and the egg is removed from the vessel. The egg now has a medium soft consistency.

A device for determining the cooked state when cooking eggs comprises for this purpose at least one vessel, a positioning means for at least one egg in the vessel, and at least one energy source for increasing the temperature. At least one light source having a wavelength between 400 nm and 1000 nm is positioned on or in the direct vicinity of the egg. Furthermore, at least one light-measuring device is arranged on the opposite side of the light source for determining the transmission of the light through the egg, wherein the egg is positioned with at least one cross section between the light source and the light-measuring device. Furthermore, the light-measuring device is connected to at least one signalling device and/or display device so that a cooked state for a runny yolk having a transmission of at least 96% of the maximum transmission degree of a raw egg, a cooked state for a soft yolk having a transmission of at least 94%, a cooked state for a medium soft yolk having a transmission of at least 90%, and/or a cooked state for a hard yolk having a transmission of at least 85% is signalled and/or displayed.

The invention claimed:

1. Device for cooking eggs comprising at least one vessel, a positioning means for the eggs in the vessel, and at least one heater, characterised in that at least one light source having a wavelength between 400 nm and 1000 nm is positioned on or in the direct vicinity of an egg, that at least one light-measuring device is arranged on the side opposite the light source for determining the transmission of the light through the egg, wherein the light source is arranged at the pointed pole of the egg, and the light-measuring device is arranged on the rounded pole of the egg, the transmission of light, which corresponds to 100%, is measured on the egg with the vessel closed, and the light-measuring device is connected to at least one signalling device and/or display device so that a cooked state for a runny yolk having a transmission of at least 96% of the maximum transmission degree of a raw egg, a cooked state for a soft yolk having a transmission of at least 94%, a cooked state for a medium soft yolk having a transmission of at least 90%, and/or a cooked state for a hard yolk having a transmission of at least 85% of the transmission degree of the egg with a transmission of 100% is signalled and/or displayed and wherein the temperature within the vessel is then increased via the heater in the vessel to at least 100° C. and maintained until the respective transmission degree is reached, and a comparison with the currently determined transmission values and activation of the signaling device and/or display device is effected via a control device.

2. Device according to claim 1, characterised in that the light source has a wavelength between 500 nm and 1000 nm, preferably between 500 nm and 650 nm.

3. Device according to claim 1, characterised in that the light-measuring device is a photodiode, a photocell, a photodetector, a phototransistor, a CMOS sensor or a CCD sensor.

4. Device according to claim 1, characterised in that the energy source is at least one electric heating wire, an inductive heating device, an electromagnetic wave source, and/or an assembly for heating water.

5. Device according to claim 1, characterised in that the vessel is a transparent vessel or a vessel impermeable to electromagnetic waves in the wavelength range from 400 nm to 1000 nm, wherein the vessel and/or the positioning means is made of stainless steel, silicone, plastics material and/or glass.

6. Device according to claim 1, characterised in that the positioning means has an annular shape for receiving an egg, wherein the diameter of the annular positioning means is smaller than the largest diameter of the egg or wherein the positioning means is formed with three or more support points with the distance between the support points to each other being smaller than the largest diameter of the egg.

* * * * *